May 6, 1924.
J. LEROY
STUFFING BOX FOR INTERNAL COMBUSTION ENGINES
Original Filed July 10, 1920
1,493,117
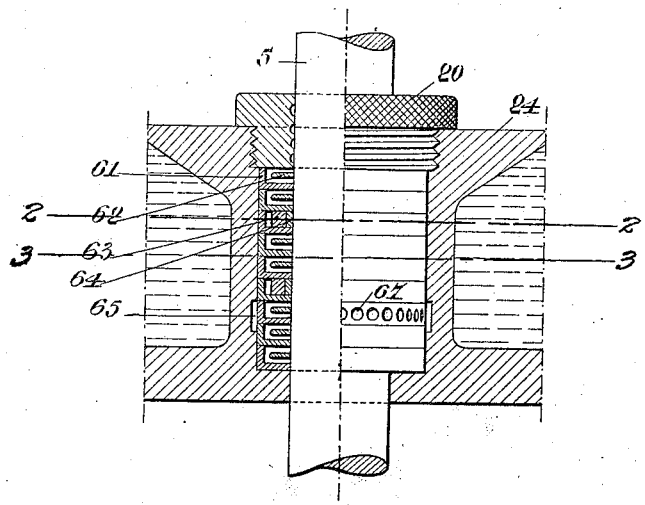
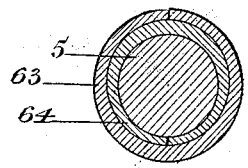
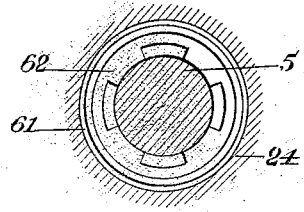
Inventor:
J. Leroy
By
Lawrence Langner
Attorney Patented May 6, 1924.

1,493,117

UNITED STATES PATENT OFFICE.

JULES LEROY, OF PARIS, FRANCE.

STUFFING BOX FOR INTERNAL-COMBUSTION ENGINES.

Original application filed July 10, 1920, Serial No. 395,338. Divided and this application filed January 9, 1922. Serial No. 528,115.

(GRANTED UNDER THE PROVISIONS OF THE ACT OF MARCH 3, 1921, 41 STAT. L., 1313.)

*To all whom it may concern:*

Be it known that I, JULES LEROY, citizen of the Republic of France, and residing at Paris, France, 12 Rue Jouffroy, have invented Improvements in Stuffing Boxes for Internal-Combustion Engines (for which I have filed an application in France Ser. No. 506,931, on June 12, 1918).

This case is a division of my copending application, Ser. No. 395,338, filed July 10, 1920.

The invention is illustrated in the accompanying drawings, in which,

Fig. 1 shows in partial section the fittings of the stuffing box.

Figs. 2 and 3 are horizontal sectional views on the lines 2—2 and 3—3, respectively, of Figure 1.

The shaft 5 traversing the plug 20 and passing through the stuffing box 24 has attached at one end the motor piston not shown, and at the other end the piston pump not shown; at this point a tight joint is necessary in order to prevent leakage from the cylinder. The tightness is assured at this point by rings and baffles constructed in the following manner: the stuffing box 24 has combined with it casing rings 61 containing either notched discs 62, or extensible rings 63 and 64. The parts 61 and 62 are constructed of bronze, and the open rings 64 are also of bronze and grip shaft 5. The rings 63, also open, are of cast iron and grip the rings of bronze 64. These two rings leave openings between their ends, when they are closed together, having a minimum interval of 5/10 mm.

There is, moreover, provided a circular channel 65 in communication with the outside air through a tube not shown intended to insure the lubrication of the fittings and of the shaft by passing through the holes 67 in one of the casing rings.

The baffles formed by the combination of parts forming the stuffing box have the object of reducing the speed of the air by checking and delaying it, and of preventing the air at the time of the compression from having sufficient time to escape through the stuffing box before the commencement of the suction stroke of the pump piston. In a stuffing box of sufficient length the rings 63 and 64 are unnecessary (unless the lineal speed of the piston is very reduced) because the casing rings and discs 61 and 62 suffice to insure the tightness of the joint.

Having now particularly described the nature of my invention, and in what manner the same is to be performed what I claim is:

An improved stuffing box for piston rods of explosion engines, ensuring a sealing of the joint about the piston rod as it traverses the end of the cylinder, said construction comprising the combination with a piston rod of juxtaposed annular casing rings, notched discs in certain of said casing rings, a pair of extensible split rings in each of the other of said casing rings, said rings tightly fitting each other, and a circular perforated ring forming one of the said casing rings, said perforated ring being surrounded by a circular channel adapted to be supplied with lubricant.

In testimony whereof, I have signed my name to this specification.

JULES LEROY.